United States Patent [19]
Kalin

[11] Patent Number: 5,760,491
[45] Date of Patent: Jun. 2, 1998

[54] METHOD AND CIRCUIT FOR DISCONNECTING A TRANSFORMER IN DEPENDENCE ON WHETHER A LOAD CONNECTED THERETO REQUIRES POWER, OR NOT

[75] Inventor: Ruedi Kalin, Seon, Switzerland

[73] Assignee: Aspro Technology AG, Wildegg, Switzerland

[21] Appl. No.: 692,369

[22] Filed: Aug. 5, 1996

[30] Foreign Application Priority Data

Aug. 7, 1995 [CH] Switzerland .......................... 02271/95
Nov. 10, 1995 [CH] Switzerland .......................... 03183/95

[51] Int. Cl.$^6$ .......................................................... H02J 3/00
[52] U.S. Cl. .......................... 307/17; 307/125; 307/141; 363/19; 363/27
[58] Field of Search .......................... 307/17, 112, 116, 307/125–131, 139, 140, 141, 141.4, 141.8; 363/19, 20, 21, 97

[56] References Cited

U.S. PATENT DOCUMENTS

| | | | |
|---|---|---|---|
| 4,370,564 | 1/1983 | Matsushita | 307/140 |
| 4,475,047 | 10/1984 | Ebert, Jr. | 307/66 |
| 5,369,307 | 11/1994 | Kobayashi | 307/125 |
| 5,481,450 | 1/1996 | Lee et al. | 363/21 |

Primary Examiner—William M. Shoop, Jr.
Assistant Examiner—Jonathan S. Kaplan
Attorney, Agent, or Firm—Frishauf, Holtz, Goodman, Langer & Chick, P.C.

[57] ABSTRACT

A transformer, typically a miniature transformer, to provide low-voltage power between, usually, 2 to 12 V from a power network has an auxiliary winding (6) inductively coupled to the core (9) of the transformer. A reference signal is provided from the power supply, and a monitoring circuit (32), which includes a difference-forming circuit (16) is coupled to receive (a) a signal from the auxiliary winding (6) and (b) the reference signal, the difference-forming signal providing an output in dependence on the state of magnetization of the core, by evaluating differences in magnetization (ΔB) depending on whether power is being supplied by the transformer, or not. A circuit interruption element (10), typically a transistor, is serially connected between the power supply (1, 2) and the transformer. To determine if, after disconnection, the load should require power, for example if the load is a user-operated appliance, or a rechargeable battery, periodically requiring recharging even if the battery is not in use, an interrogation circuit (30) is coupled to the power supply to periodically, or aperiodically, based on time, or on the value of a physical parameter, reconnect the transistor (10) for a brief interval, in the order of milliseconds, to permit determination if power is being required, or not. If power is required, the transistor will remain conductive; if no power is required, however, the circuit will again control the transistor to non-conduction, thereby saving magnetization current flowing into the transformer if there is no need, based on required power.

20 Claims, 2 Drawing Sheets

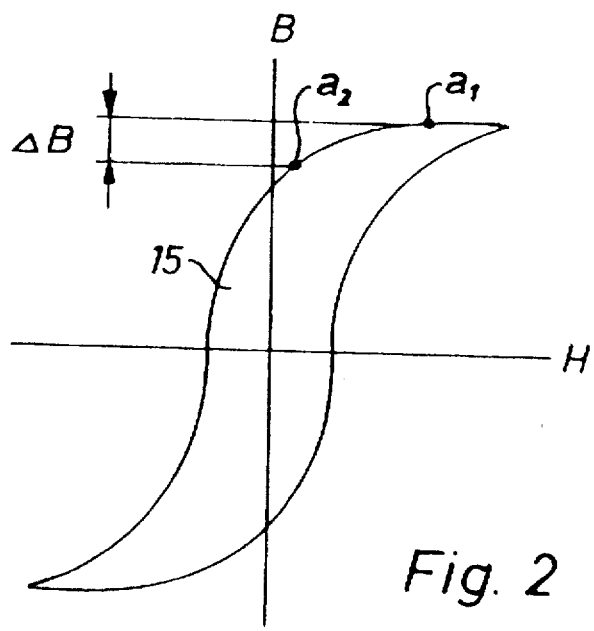
Fig. 2
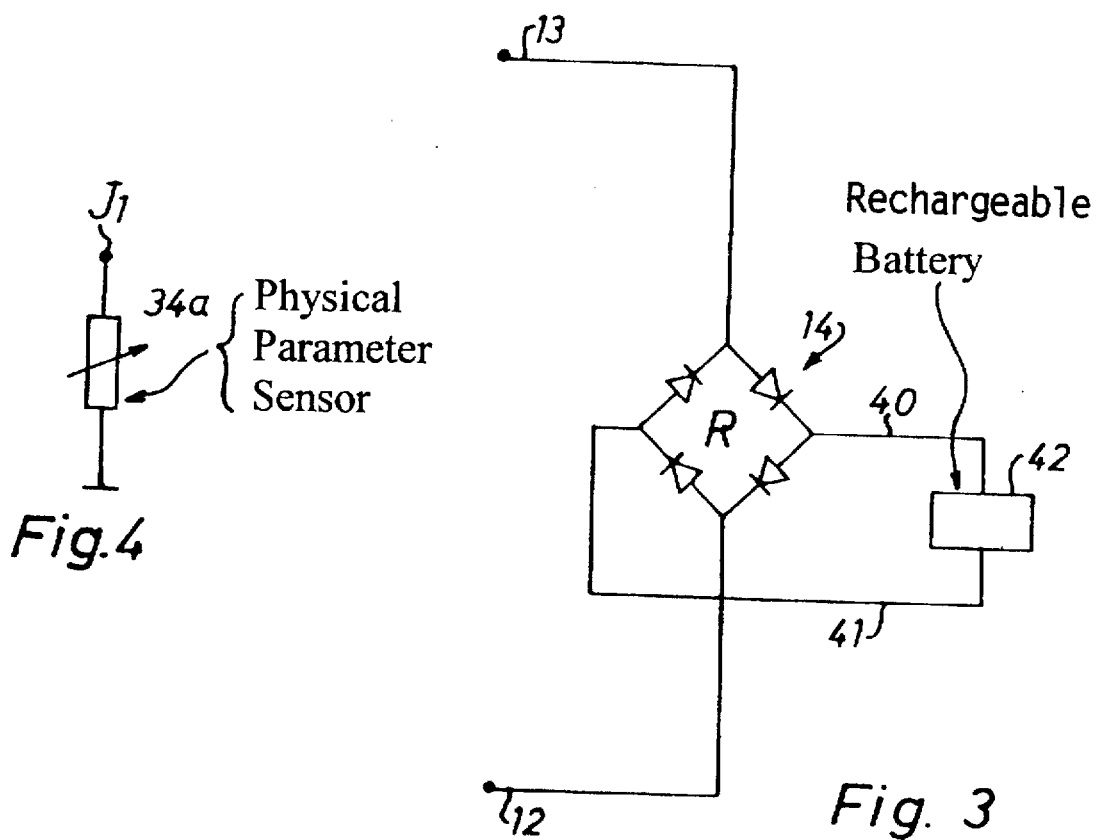
Fig. 4
Fig. 3

METHOD AND CIRCUIT FOR DISCONNECTING A TRANSFORMER IN DEPENDENCE ON WHETHER A LOAD CONNECTED THERETO REQUIRES POWER, OR NOT

FIELD OF THE INVENTION

The present invention relates to circuitry and a method carried out by the circuit for disconnecting a transformer, and more particularly a miniature transformer adapted for connection to a power network when a load connected thereto, for example a rechargeable battery of a lamp or the like or other low-voltage apparatus, does not require power. Transformers of this kind are miniature or small transformers which reduce power network voltage, for example of 110 V nominal, 60 Hz, or 230 V, 50 Hz down to between 1 and 50 V and usually between about 2 and 12 V.

BACKGROUND

Many miniature or small transformers are used which reduce network voltage to 2, 6, 9, or 12 V, for example, in order to supply low voltage apparatus, for example telecommunication apparatus, halogen lamps, rechargeable batteries for lamps, or other apparatus, or the like. Transformers of this kind are frequently permanently connected, for example by plug connectors inserted in receptacles or outlets of the power network; they remain connected to the power network for many hours, frequently permanently throughout the year, although the load requires power only for very short time, for example for several minutes per day. Such transformers have current flowing therethrough, that is, they consume power even though the load connected thereto does not require any energy. An average small transformer no-load current may be between 30 and 60 MA which, when permanently connected for a year, would consume 55 kWh per year. This is a waste of energy. The transformers, even without any load current being drawn off a secondary, become warm, which, if they are located in air-conditioned surroundings, require heat removal from the air-conditioning system, an additional waste of energy.

Customary, conventional battery charge apparatus, likewise, when connected permanently to an a-c power network, also draw current, even though a battery connected thereto does not require further charging. If the battery is integrated with a flashlight or other apparatus or a holder therefor, it is customary to leave the flashlight or apparatus in the charging unit permanently, except when in use. Energy loss, when no energy is required by the load, for example to recharge the battery of the flashlight, is small for a short period of time; over time, for example over a year, a considerable amount of energy is wasted.

THE INVENTION

It is an object to provide a circuit which can be readily integrated within the housing of a miniature transformer and which automatically disconnects the transformer when no power is needed, which is simple, and can be so arranged that the primary of the transformer is disconnected from the power network, if no current is drawn from the secondary, while providing automatic re-connection if the load, for example, the battery, requires current.

Briefly, the transformer is supplied with an auxiliary winding which may have only few turns with respect to the primary, for example one-fifth to one-twentieth the number of turns, in order to inductively couple the primary winding to the core of the transformer. A reference signal is generated, for example from the power network, which is connected to a monitoring circuit which includes a difference-forming circuit. The difference-forming circuit receives a signal from the auxiliary winding, as well as the reference signal, and provides an output signal in dependence on the state of magnetization of the core, by evaluating the difference in magnetization in dependence on whether power is drawn from the secondary of the transformer, or not. The difference circuit then controls a circuit interrupting element, for example a transistor serially connected between the power supply and the transformer; the circuit interrupter is coupled to and controlled by the output signal from the difference-forming circuit.

In accordance with a feature of the invention, the method includes detecting the degree of saturation of magnetization of the core of the transformer in dependence on the requirement of current from the secondary. The auxiliary winding detects a difference in saturation of magnetization of the core in dependence on whether current is drawn from the secondary, and provides the signal to the difference circuit, which is there compared with the reference.

Basically, thus, the invention determines whether a load, or a user circuit requires current or not by evaluating change in the magnetic saturation of the iron core of the transformer. The auxiliary winding, added to the transformer besides the customary primary and secondary, will have the signal induced therein which, then, is used to control the circuit interruption device, typically a transistor.

DRAWINGS

The drawings illustrate an example of the invention, and will be referred to in the explanation of the method.

FIG. 2 is the hysteresis curve, with working points entered therein;

FIG. 3 is a fragmentary schematic circuit diagram illustrating the use of the circuit in connection with a battery-charging system; and FIG. 4 is a fragmentary diagram illustrating another embodiment of a circuit component used in the present invention.

DETAILED DESCRIPTION

Figure 1:
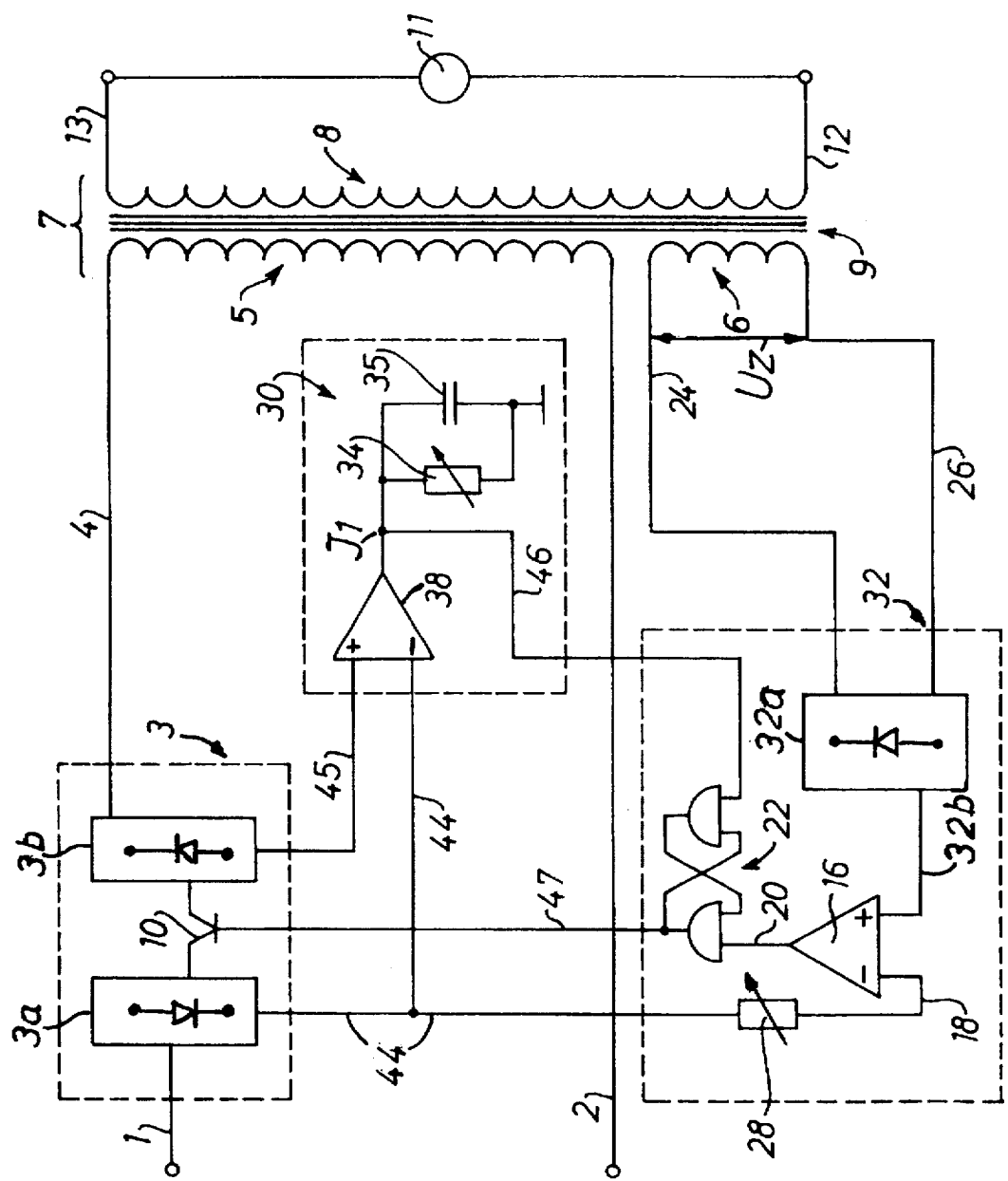
FIG. 1 shows a circuit diagram of a low-power transformer connected to a load shown only schematically.

FIG. 1 shows two power supply connection lines 1, 2 which have customary a-c network power applied thereto, for example 110 V, 60 Hz or 230 V, 50 Hz. One of the lines, for example line 1, is connected to an a-c disconnect circuit 3, from which a connection line 4 leads to the primary winding 5 of a transformer 7. The secondary 8 of the transformer 7 is connected by output lines 12, 13, to a load 11. The second terminal of the primary winding 5 is connected to the second terminal 2 of the power network.

In accordance with a feature of the invention, an auxiliary winding 6 is provided in the transformer. The number of turns of the primary winding is at least five times, and preferably about twenty times as high as the number of turns of the auxiliary winding 6. The auxiliary winding 6 can be located coaxially outside, or inside of the primary winding. The transformer has the customary iron core 9, inductively coupling the primary and secondary windings 5, 8, as well as being inductively coupled to the auxiliary winding 6.

The interrupter circuit 3, serially connected between the input line 1 and line 4 to the transformer, is connected by one line 44 to a monitoring circuit 32. The monitoring circuit 32 is connected over lines 24, 26 to the auxiliary winding 6. The monitoring circuit 32 has a first differential amplifier 16 which receives a reference voltage through a calibrating resistor 28 connected in line 44, as well as the control signal Uz derived from the auxiliary winding 6. The difference-forming circuit 16, in the example the differential amplifier 16, receives over the line 18 a reference voltage, which is suitably calibrated by a calibrating resistor 28, which is a variable resistor, as shown. Other arrangements to supply a reference voltage can be used.

The circuits further include an interrogation circuit 30 which determines whether current is supplied by the secondary 8 of the transformer 7, or not. The interrogation circuit has a timing circuit formed, for example, by a controllable resistor 34 and a capacitor 35, as well as a second difference-forming circuit, for example a second differential amplifier 38. The timing circuit 34 causes connection of the transformer through the interrupter circuit 3 to the power supply from time to time, periodically or aperiodically, for short intervals, for example a few milliseconds. The interrogation interval can vary between one second, several seconds, and several hours, in dependence on the nature of the load 11, and the tolerance for delay in connection of the load 11 after a user may wish to operate the load, for example a dictation machine. The interrogation interval can be fixed, or controlled, as desired, by suitable setting of the resistor 34.

The interrupter circuit 3 has two interface elements 3a, 3b which, for example, each include a diode; a transistor 10 is connected between the interface circuits 3a, 3b. The second differential amplifier 38 is connected through line 44, as well as another line 45 to the interface circuits 3a, 3b, in advance of and downstream of the transistor 10.

The monitoring circuit 32 includes an interface element 32a which, for example, may include a diode, and a flip-flop 22, connected to output line 20 of differential amplifier 16 and further by line 46 to a junction J1 at the output of the second differential amplifier 38. The flip-flop 22 provides an output control signal over line 47 to the transistor 10.

Rather than using a timing circuit formed by resistor 34 and capacitor 35, a sensor element 34a responsive to a physical parameter (FIG. 4) can be used, connected to junction J1. This element may be a temperature sensor, for example to connect a load formed by a battery charger in case of low ambient temperatures, may be a pressure responsive device or the like, shown schematically only by block 34a in FIG. 4.

OPERATION

Let it be assumed that the transistor 10 in the interrupter circuit 3 is controlled to be conductive. The transformer 7 will receive the customary voltage derived from the a-c network over the lines 1, 4 and return over line 2. FIG. 2 shows the well-known B-H magnetization curve. When the secondary 8 draws current, the iron core 9 will provide a counter induction and the magnetic flux in the iron core, in view of the counter induction, decreases. The working point on the hysteresis curve, when current is drawn, will be point a2 (FIG. 2). When no current is drawn, or the current which is drawn from the secondary is very small, for example the trickle current of a charged battery, the iron core 9 will be magnetized such that the working point will be point a1 on the hysteresis curve, that is, the magnetization B with respect to field strength H, shown on the abscissa of FIG. 2, will also be high. Operating at the working point a1 results in a relatively high output signal $U_z$ in the auxiliary winding 6. This relatively high voltage or signal is applied over the lines 24, 26 to the interface 32a and to one terminal of the differential amplifier 16.

The reference voltage from line 18 connected to the first differential amplifier 16 must be calibrated before the system is first connected. For calibration, current is drawn from the secondary 8, and a load 11 is connected. The voltage from the auxiliary winding is applied to the differential amplifier 16. The voltage applied to the other terminal from line 18 is calibrated by the resistor 28, such that the voltage at lines 18 and 32b connected to the differential amplifier 16 will be the same.

When current is drawn from the secondary 8 of the transformer 7, the counter induction in iron core 9 will drop due to the counter induction, since the magnetic flux will drop. The working point on the hysteresis curve 12, thus, will be point a2. The signal derived from the auxiliary coil 6, due to calibration, will now be the same as that on line 18. The difference amplifier 16, thus, will not provide any output, and hence no control signal will be applied to the transistor 10. The transistor 10 remains in conductive condition.

If, then, the load 11 is disconnected from lines 12, 13 of the transformer 7, or, for example, when the load 11 is replaced by the load 14, FIG. 3, which includes a rectifier R and a rechargeable battery 42, and the battery 42 is fully charged, there is only small counter induction in the iron core. The auxiliary winding 6 will have a higher output signal $U_z$ corresponding to the working point a1 on the hysteresis loop 12. The first differential amplifier 16 recognizes a difference between the input signal from line 18 and from line 32b, which controls the flip-flop 22 which, in turn, controls the transistor 10 to change to blocked, or disconnect state, thus separating the primary winding 5 of the transformer 7 from the power supply 1, 2. In effect, no voltage is supplied across the lines 2, 4 of the transformer 7.

Change in the degree of magnetization of the iron core 9 changes a voltage on the auxiliary winding 6 due to counter induction. The change in magnetization is illustrated at ΔB in FIG. 2; it depends on the load on the secondary and is utilized to connect, and disconnect the primary winding of the transformer. Mathematically, the following relationship pertains:

$$U_z = 4.44 \cdot B \cdot n \cdot A \cdot f$$

wherein $U_z$=the voltage across the auxiliary winding in volts V
B=magnetization of the iron core in Tesla
n=number of turns of the auxiliary winding 6
A=cross-section of the iron core through the coil in $cm^2$
f=frequency in Hz
4.44=a constant.

When the transformer 7 has been effectively disconnected from the power network 1,2, and the load requires current, some means must be provided to automatically return the transformer 7 into operating state without manual intervention. This return of the transformer to connected state is controlled by the interrogation circuit 30.

The interrogation circuit 30 determines if current is needed at the secondary 8 of the transformer. The interrogation circuit causes the transistor 10 to become conductive for a very brief period of time determined, for example by the set-reset time of flip-flop 22, for example a few milliseconds, in periodically recurring, or in aperiodic intervals, in which the timing of the intervals is controlled by the timing circuit 34, 35 or, alternatively, upon occurrence of a physical event, as determined by sensor 34a (FIG. 4). If time is the controlling parameter, the timing interval can be fixed or controllable, in intervals between a second and various hours, for example.

The two connecting lines 44, 45 are connected to the interrupting circuit 3 in advance and downstream of the transistor 10.

Operation of interrogation circuit 30: When the timing circuit 34 becomes active after elapse of the interrogation interval, or if a physical event controls the sensors 34a, a resulting control signal is applied over line 46 to the flip-flop 22, or, for example, to another control circuit in parallel with the flip-flop 22. As a consequence, the transistor 10 will be controlled over line 47 to become conductive. Upon conduction, the previously described conditions will prevail, that is, if power is required by the load, the counter induction will cause the working point on the hysteresis loop 15 (FIG. 2) to drop to $a_2$, no control signal is provided by the differential amplifier 16 to line 20, and hence to the transistor 10 and the transistor, upon continued requirement of current from the transformer 7, remains conductive.

If, however, upon such re-connection, no current is drawn by the load 11, 14, or by the battery 42 (FIG. 3), the terminals of the first differential amplifier 16 will have unequal voltages applied, resulting in generation of a control signal on line 47 to the transistor 10, causes the transistor 10 to block, or become non-conductive. The transformer 7 is severed from the network 1, 2, of course, the reference signal alone also establishes inequality of differential amplifier 16.

The interrogation circuit 30 can become active only when the transistor 10 is in its non-conductive, or blocked state, since, only then, there will be a difference in voltage applied to the second differential amplifier 38 over lines 44, 45, and hence, voltage across the timing circuit 34, 35 or, respectively, the physical value sensor 34a (FIG. 4).

The interrupter circuit 3, the monitoring circuit 32, and the interrogation circuit 30 are connected to the primary of the transformer 7. This ensures that complete galvanic separation, due to the transformer 7, is maintained without any additional circuit or network. Thus, customarily demanded safety requirements of low-voltage secondary circuits, that is, galvanic separation from the power network, is maintained. The additional costs and circuit requirements with respect to a transformer alone are small; the space requirements are minimal. The entire circuit can be formed as an integrated circuit.

It is possible, of course, to apply the auxiliary winding 6 to the secondary; that, however, requires additional insulation to ensure complete separation of the low-voltage circuit connected to the secondary of the transformer from the power network.

The timing circuit formed by resistor 34 and capacitor 35 can be replaced by any other controlled element 34a, which may be, for example a temperature sensor, pressure sensor, or a sensor of other physical values or parameters, for example presence or absence of an article or a device, a fluid, or the like.

FIG. 3 illustrates the invention when applied to a battery charging unit, for example a circuit which includes a rectifier R connected to a rechargeable battery 42 through suitable lines 40, 41 connected to the rectifier R. The circuit connected to terminals 12, 13 is identical to that shown in FIG. 1.

Various changes and modifications may be made within the scope of the inventive concept.

The interface elements 3a, 3b, 32a are shown only schematically in block form, since they may be of any suitable construction; usually, they include a rectifier, and may include voltage divider circuits or the like. Zener diodes may also be used. They can be built based on well-known engineering knowledge. Well-known auxiliary circuit elements, e.g., transistor base resistors and the like, have been omitted for clarity.

The interface elements 3a, 3b are well known in the art and include two diodes. The transistor 10 is by example a transistor of the type SIPMOS Power Transistor BUZ 74 made by Siemens according to the specification in eight sheets attached hereto and forming part of this application.

I claim:

1. Circuit for automatically disconnecting the primary winding (5) of a transformer (7) from an a-c power supply network (1, 2) when a load (11, 14) connected to the secondary (8) of the transformer (7) does not require power from the transformer, and wherein said transformer has a ferromagnetic core (9), said circuit comprising an auxiliary winding (6) inductively coupled to the core (9) of the transformer;

means (3a, 28) for providing a reference signal;

a monitoring circuit (32) including a difference circuit (16), said difference circuit being coupled to receive (a) a signal from the auxiliary winding (6) and (b) said reference signal, said difference circuit (16) providing an output signal in dependence on the state of magnetization of said core by evaluating differences in magnetization ($\Delta B$) by said auxiliary winding depending on whether power is being supplied by the transformer (7) to the load, or not;

a circuit interruption means (10) serially connected between said power supply (1, 2) and the transformer (7), said circuit interruption means being coupled to and controlled by said output signal from the difference circuit (16); and an interrogation circuit (30) connected across said circuit interruption means (10) and further connected to render said circuit interruption means conductive, said interrogation circuit being responsive to at least one of:

elapsed time after the circuit interruption means has interrupted the circuit between the power supply (1, 2) and the transformer (7), and a physical parameter or value, said interrogation circuit controlling conduction of the circuit interruption means in accordance with said at least one:

elapsed time and physical parameter or value.

2. The circuit of claim 1, wherein the auxiliary winding (6) is intimately, inductively coupled to the primary winding (5) of the transformer (7), optionally being wound over, or below said primary winding.

3. The circuit of claim 1, wherein the number of turns of the primary winding (5) is at least five times the number of turns of the auxiliary winding (6) and optionally has more than 20 times as many turns as the auxiliary winding.

4. The circuit of claim 1, wherein said interrogation circuit comprises a timing circuit (34, 35), and determining a time interval after which the circuit interruption means is controlled to become conductive and thus establish a connection between said power supply (1, 2) and the transformer (7).

5. The circuit of claim 1, wherein said physical value controlling said interrogation circuit includes a sensor (34a) controlling said circuit independently of time and in dependence on the value of a physical parameter, optionally pressure or temperature.

6. The circuit of claim 1, wherein said interrogation circuit comprises a difference-forming circuit (38), receiving signals from the power supply and downstream of the circuit interruption means (10), said difference circuit (38) being connected to control said circuit interruption means.

7. The circuit of claim 1, wherein a flip-flop circuit (22) is connected between the difference circuit (16) and said circuit interruption means (10) and providing said output signal.

8. The circuit of claim 7, wherein said flip-flop circuit (22) has a set-reset time in the order of milliseconds.

9. The circuit of claim 1, wherein a flip-flop circuit (22) is connected between the difference circuit (16) and said circuit interruption means (10) and providing said output signal;

and wherein the output from said interrogation circuit is connected to change the state of said flip-flop circuit.

10. The circuit of claim 9, wherein said circuit interruption means (10) comprises a transistor.

11. The circuit of claim 1, wherein said circuit interruption means (10) comprises a transistor.

12. The circuit of claim 1, in combination with a rectifier (R) coupled to a rechargeable battery (42), said rectifier-battery combination forming said load.

13. A method to automatically disconnect the primary winding (5) of a transformer from an a-c power supply network (1, 2) when a load (11, 14) connected to the secondary (8) of a transformer does not require power from the transformer, said transformer having a ferromagnetic core (9), and a circuit interruption means (10) is serially connected between the power supply (1, 2) and the transformer (7), said method comprising the steps of determining the difference in saturation of magnetization (ΔB) of the ferromagnetic core (9) of the transformer in dependence on requirement of current from the secondary (8), by deriving a sensing signal from an auxiliary winding (6) inductively coupled to the core (9) of said transformer;

controlling the circuit interruption means (10) in dependence on said magnetization difference (ΔB) as derived by the sensing signal; and periodically or aperiodically, optionally in dependence on time or the value of a physical parameter, controlling said current interruption means (10) if in non-conductive state, to conduction for a brief period of time, optionally in the order of milliseconds, to test if the load does, upon such brief control to conduction, then require power.

14. The method of claim 13, wherein said magnetic saturation determination step comprises sensing the difference in saturation of magnetization of the core (9) between the primary winding (5) and the auxiliary winding (6) of the transformer.

15. The method of claim 13, wherein said current interruption means (10) comprises a transistor, and said controlling step comprises selectively controlling said transistor to conduction, if the load requires power, or non-conduction, if the load does not require power.

16. Circuit for automatically disconnecting the primary winding (5) of a transformer (7) from an a-c power supply network (1, 2) when a load (11, 14) connected to the secondary (8) of the transformer (7) does not require power from the transformer, and wherein said transformer has a ferromagnetic core (9), said circuit comprising an auxiliary winding (6) inductively coupled to the core (9) of the transformer;

means (3a, 28) for providing a reference signal;

a monitoring circuit (32) including a difference circuit (16), said difference circuit being coupled to receive (a) a signal from the auxiliary winding (6) and (b) said reference signal, said difference circuit (16) providing an output signal in dependence on the state of magnetization of said core by evaluating differences in magnetization (ΔB) by said auxiliary winding depending on whether power is being supplied by the transformer (7) to the load, or not;

a circuit interruption means (10) serially connected between said power supply (1, 2) and the transformer (7), said circuit interruption means being coupled to and controlled by said output signal from the difference circuit (16); and a flip-flop circuit (22) connected between the difference circuit (16) and said circuit interruption means (10) and providing said output signal.

17. The circuit of claim 16, wherein the auxiliary winding (6) is intimately, inductively coupled to the primary winding (5) of the transformer (7), optionally being wound over, or below said primary winding.

18. The circuit of claim 16, wherein the number of turns of the primary winding (5) is at least five times the number of turns of the auxiliary winding (6) and optionally has more than 20 times as many turns as the auxiliary winding.

19. The circuit of claim 16, wherein said flip-flop circuit (22) has a set-reset time in the order of milliseconds.

20. The circuit of claim 16, in combination with a rectifier (R) coupled to a rechargeable battery (42), said rectifier-battery combination forming said load.

* * * * *